March 25, 1941. A. MAAG 2,235,939
CUPOLA
Filed Aug. 5, 1939
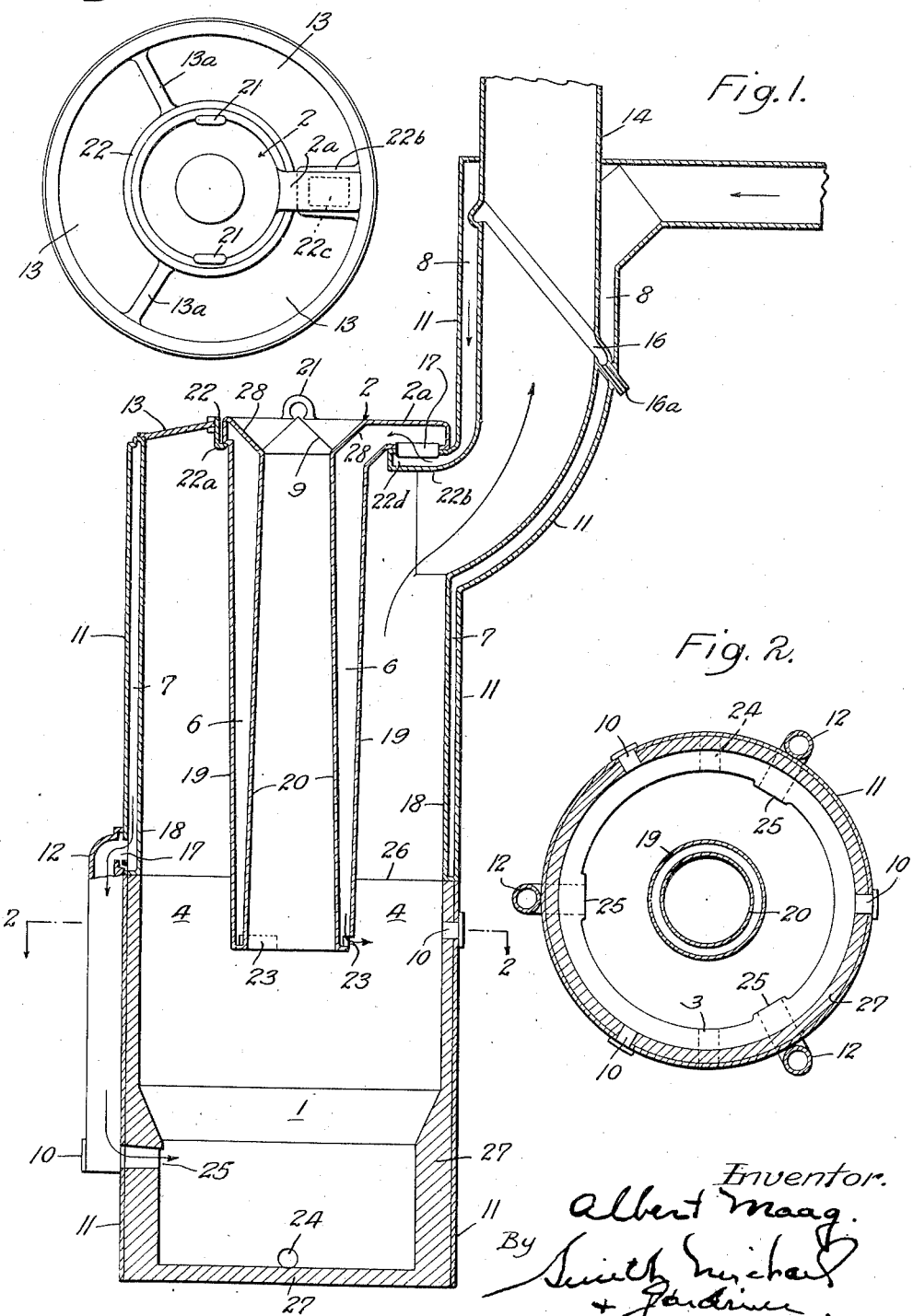
Inventor.
Albert Maag.
By Smith, Michael
& Gardiner
Attorney.

Patented Mar. 25, 1941

2,235,939

UNITED STATES PATENT OFFICE 2,235,939

CUPOLA

Albert Maag, Chicago, Ill.

Application August 5, 1939, Serial No. 288,608

6 Claims. (Cl. 75—43)

My present invention relates to cupolas and has particular reference to the provision of a new and improved cupola for melting ferrous and/or non-ferrous metals, various kinds of alloys and/or minerals such as limestone, by means of burning coke, coal, charcoal or other carbonaceous fuel.

It is an object of my invention to provide a cupola of the vertical furnace type in which the heat usually wasted in cupolas of the prior art is utilized to preheat and partly change the chemical composition of the metal, alloy or other material being melted in the cupola before such metal, alloy or material enters into direct contact with the heat and gases generated by the lower blast and in the melting zone of the cupola.

It is an object of my invention to provide a cupola possessing the maximum degree of heat and fuel economy for melting the metal or other material and in which desirable preheating and chemical reactions are performed on the metal or other material above the normal melting zone of the cupola, which melting zone is established by the direct combustion of the fuel in the region of the lower blast of the cupola.

It is an object of my invention to provide a cupola and a method of operating the same, in which the absorption of impurities by the metal or other material from the fuel and products of combustion are reduced to the minimum, and to greatly increase the melting capacity of a given size of cupola.

In order to more clearly explain my present invention and to point out the manner in which my cupola and its method of operation distinguish from conventional cupolas and their methods of operation, I desire to point out that whenever carbon dioxide ($CO_2$) is produced in a cupola in the presence of free carbon (C) at a temperature of approximately 550° C. (approximately 1020° F.), it is reduced to carbon monoxide (CO) in accordance with the following endothermic reaction:

$$CO_2 + C = 2CO$$

Consequently, it follows that in the conventional cupola and in accordance with the conventional method of operating cupolas in which the metal or other materials being melted remain in direct contact with the fuel throughout the melting operation, carbon monoxide (CO) is the final product of the combustion of the carbonaceous fuel. Therefore the metals or other material charged into the conventional cupolas are preheated and melted with the heat generated as the result of the following chemical reaction:

$$C + O = CO$$

To explain this reaction in accordance with the weights (metric system) and the number of calories produced, reference may be had to the following formula which results in the development of approximately 2450 calories, namely:

1 kg. carbon (C) + 1⅓ kg. oxygen (O) = 2⅓ kg. carbon monoxide (CO)

Referring, further, to the operation of the conventional cupola and with particular reference to the burning of limestone, it is to be noted that in accordance with conventional practice, ordinary limestone decomposes in the preheating zone of the cupola at a temperature of approximately 800° C. or greater. This decomposition may be represented by the following formula:

$$CaCO_3 + C = CaO + 2CO$$

By means of the cupola construction and its method of operation which forms the subject-matter of my present invention, the above-referred to chemical reactions are changed materially, due principally to the utilization of the heat generated by the combustion of carbon monoxide (CO) to carbon dioxide ($CO_2$) for preheating the metal or other materials being melted in the cupola. These vastly improved results are attributable to the means by which I separate the metal or other material from the burning carbonaceous fuel during the preheating stage, and are attained, in accordance with my present invention, by utilizing the full heat generated from the combustion of carbon (C) to carbon dioxide ($CO_2$). In the operation of my improved cupola and in accordance with my present method of operation, I am able to develop and effectively utilize approximately three times the heat developed and utilized in the conventional cupola.

In the accompanying drawing, wherein for the purpose of illustration, I have shown a preferred embodiment of my invention, Figure 1 is a vertical sectional view illustrating the preferred form of the cupola and showing its various features of construction, Fig. 2 is a transverse sectional view on the line 2—2 of Fig. 1, and Fig. 3 is a fragmentary plan view of the cupola illustrated in Fig. 1.

In the accompanying drawing, wherein like reference characters have been employed to designate like parts throughout the several views, I have shown a cupola or vertical furnace primarily adapted for use in the melting of ferrous or non-ferrous metals, alloys of metals, minerals or the like, by the combustion of coke, coal, charcoal or other carbonaceous fuels. This cupola comprises a substantially cylindrical outer, metallic shell or casing 11, the lower portion of which is lined with a refractory lining 27. The lower part of the shell or casing, i. e., the lower part provided with the refractory lining 27, constitutes the melting portion or crucible of the cupola, and is provided with a slag spout 3 (Fig. 2) spaced from the bottom of the melting portion or crucible, and with a main outlet tap or discharge opening 24 positioned at a level below that of the slag spout 3, preferably near the bottom of the cupola.

The portion of the cupola immediately above the refractory lining 27 is provided with an inner cylindrical shell 18 disposed in parallel spaced relation with respect to the outer shell 11 to provide therebetween an unobstructed air space 7, which air space 7 communicates, by means of blast pipes 12, with the lower blast orifices or tuyères 25, preferably three in number, as shown in Fig. 3. The actual melting zone of my improved cupola is positioned slightly above the plane of the lower blast orifices or tuyères 25 and is designated by the reference character 1. Suitable observation or "peep" openings 10 are provided, these openings extending through the outer shell or casing 11 and through the refractory lining 27, as clearly shown in Figs. 1 and 2, and being positioned near the upper portion of the said refractory lining.

To one side of the cupola, preferably near the top thereof, I connect a stack 14 for conducting away the burnt gases resulting from the cupola operation, this stack being provided with an inclined groove or gutter 16 into which condensed vapors will collect and be passed off to the outside of the cupola through a suitable drain 16a. The stack 14 has its inner, open end connected to the inner casing 18 of the cupola, and the outer shell or casing 11 of the cupola surrounds the lower portion of the said stack and provides an annular air space 8 therebetween, this air space communicating with the air space 7 and with an air inlet pipe 15 through which air may be forced under controlled pressure by means of a suitable blower or compressor (not shown).

The top of my improved cupola consists of a series, say three, of arcuate openings closed by doors or plates 13, these openings being utilized for the charging of the metal or materials into the cupola. A pair of spaced webs 13a extend radially inward from the upper open edge of the top of the cupola and have secured to their inner ends an annular member 22 having an inwardly-projecting flange 22a for a purpose to be hereinafter described. That side of the cupola top adjacent the stack 14 is provided with an inwardly-extending portion 22b which includes portions of the outer shell or casing 11 and of the stack 14, these portions being spaced to provide an air space 22d communicating with the air space 8 surrounding the stack 14. The top of the inwardly-extending portion 22b is provided with an opening 22c which may be regulated by means of a damper 17 actuated by any suitable means (not shown) to control the air passing through the opening 22c.

As a means for supplying the carbonaceous fuel to the cupola, I provide a fuel magazine and fuel protector designated broadly by the reference character 2. This device, when assembled within the cupola, rests upon the flange 22a of the annular member 22 and includes a hollow, radially-extending projection 2a provided with an opening on its underside adapted to register with the opening in the top of the inwardly-extending portion 22b of the cupola, the arrangement being such that a portion of the air forced through the air inlet pipe 15 and through spaces 8 and 22d, will pass through the opening in the portion 22b and into the hollow projection 2a, the amount of such air being regulated by means of the damper 17. The fuel magazine further includes an outer shell or casing 19 which tapers downwardly at a slight angle from the top of the magazine to its bottom; an inner shell or casing 20 spaced from the shell 19 to provide therebetween an annular air space 6, which shell or casing 20 tapers upwardly at a slight angle from the bottom of the magazine toward the top thereof; an inwardly sloping wall or "funnel" 28 extending between the upper ends of the outer shell 19 and the inner shell 20; a closure 9 adapted to cover the top opening defined by the upper edge of the inner shell 20; and a pair of eyes 21 to which suitable hoisting mechanism may be attached for lifting the fuel magazine and fuel protector 2 out of the cupola and for inserting the same therein. The lower ends of the shells or casings 19 and 20 are closed by a suitable end wall and the lower end of the outer shell or casing 19 is provided with suitable openings 23.

It will be obvious from the above description, that the air for the lower blasts or tuyères 25 is supplied by the main air supply pipe 15 and that the air forced through said pipe by means of a suitable blower or compressor (not shown) will pass through the air space 8, through the air space 7, through the air ducts 12 and into the lower part of the cupola, said air being highly heated on its way from the pipe 15 to the blasts or tuyères 25 by the heat developed within the cupola by the burning fuel therein. In addition to the air supplied in this manner, a top or "upper" blast of air is supplied to the cupola through the openings 23, the air for this top or "upper" blast passing from the pipe 15, through the space 8, through the openings in the hollow projections 22b and 2a, through the air space 6, and out of the openings 23.

Referring now to the operation of my improved cupola, the detailed construction of a preferred embodiment of which I have above described, the first step, after repairing the cupola from the wear and corrosion resulting from a previous operation, is to start a fire in the lower portion of the cupola and to bottom charge the cupola with fuel and metal or other material to be treated, as is the common practice in starting conventional cupola operation. This bed of burning fuel and superimposed metal or material extends upwardly of the cupola to a level corresponding approximately to the level to be occupied by the lower end of the fuel magazine 2. The fuel magazine 2 is next inserted through the top of the cupola; the closure 9 removed; carbonaceous fuel such as coke, coal, charcoal or the like is poured into the space defined by the shell or casing 20 until this space is substantially filled with said fuel; and the closure 9 is then replaced. Covers 13 are then removed from the top of the cupola and the metal or other material to be treated is introduced through the top openings until the level of the metal or material substantially reaches the top of the cupola. Covers 13 are then replaced.

The cupola having been started and having been charged with fuel and metal or material as above described, the lower blasts or tuyères 25 are turned on and the damper 17 is opened to permit air to blast through the openings 23. When this is done it is found that the complete combustion of the carbon monoxide to carbon dioxide is effected at a level above the lower end of the fuel magazine 2, i. e., above the level of the top or "upper" blasts 23. This results in the preheating of the metal or material in the upper part of the cupola and above the actual melting zone and this preheating continues for the entire duration of the melting and treating process. As the fuel in the magazine 2 is consumed, additional fuel may be supplied, and, as the metal or materials are melted, additional metal or materials are supplied through the top of the cupola. When the heating and melting process has been completed, the air blasts are shut off, the bottom of the cupola is dropped, and the fuel magazine 2 is hoisted from the cupola.

By the use of the mechanism above described and in accordance with the method of operation above outlined, it will be apparent that I effectively utilize the heat generated from the combustion of carbon monoxide to carbon dioxide for preheating the metal or materials charged into the cupola above the melting zone therein. Due to the separation of the metal or materials from the carbonaceous fuel throughout the preheating period, the full heat generated by the combustion of carbon to carbon dioxide is attained and absorbed by the melting process. This reaction may be represented by the following formula:

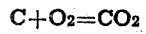

$$C + O_2 = CO_2$$

and may be explained more clearly in connection with weights (metric system) and the number of calories produced by the following formula:

1 kg. carbon (C) + 2⅔ kg. oxygen (O) = 3⅔ kg. carbon dioxide ($CO_2$)

This produces approximately 8133 calories, i. e., more than three times the heat produced and utilized in the conventional cupola.

As the cupola of my present invention and its method of operation generates heat in excess of 800° C. without the presence of free carbon, the following results are obtained when heating ordinary limestone in the cupola, namely:

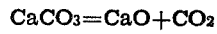

$$CaCO_3 = CaO + CO_2$$

This reaction occurs without loss of fuel or carbon, and the endothermic reaction of $CO_2 + C = 2CO$, with corresponding loss of heat, is definitely prevented.

Since the heat generated at the melting zone amounts theoretically to approximately 2450 calories for each kilogram of elementary carbon oxidized to carbon monoxide, it follows in my cupola and in accordance with my process, that one kilogram of carbon, after its first oxidation to carbon monoxide, generates in the preheating zone and under the influence of the top or "upper" blast approximately 5683 calories, i. e., approximately 8133 calories minus approximately 2450 calories. Carbon dioxide is the final product of the oxidation and in both of the zones, i. e., the melting and preheating zones, it is desirable to supply equal amounts of oxygen in order to obtain and maintain maximum efficiency of operation. When it is found desirable to reduce the temperature in the preheating zone, this may be readily accomplished by adjusting the damper 17 to reduce the volume of air supplied through the opening 23 in respect to the volume of air supplied through the bottom blasts or tuyères 25. This obtainable regulation of the top or "upper" blast with respect to the bottom blast constitutes an important feature of my present invention.

It is to be understood that the form of my invention shown and described herein is to be taken as a preferred embodiment of my invention and that various changes may be made in the shape, size and arrangement of parts and in the details of operation, without departing from the spirit of my invention or the scope of the subjoined claims.

Having thus described my invention, I claim:

1. A cupola comprising an upright body portion having a melting chamber at the lower part thereof, a fuel supply casing depending from the top of said cupola and terminating adjacent the lower portion of the cupola at the melting zone therein, said cupola including a space surrounding said fuel supply casing and containing a mass of metal to be melted within said cupola, means for discharging air in an outward, radial direction from the lower end of said fuel supply casing and into the gases escaping from the melting zone prior to the passage of said gases through the metal contained in the space surrounding said fuel casing, and means for discharging the gases from said cupola after the passage of said gases through the metal contained therein.

2. A cupola comprising an upright body portion having a melting chamber at the lower part thereof, a fuel supply casing having a hollow wall and depending from the top of said cupola and terminating adjacent the lower portion of said cupola at the melting zone therein, said hollow wall of said fuel supply casing having outwardly-directed discharge apertures at the lower part thereof, said cupola including a space surrounding said fuel supply casing for containing metal to be melted within said cupola, means for supplying air to the hollow wall of the fuel casing to discharge from the outwardly-directed apertures thereof and into the gases escaping from the melting zone prior to the passage of said gases through the metal contained in the space surrounding said fuel casing, and means for discharging the gases from said cupola after the passage of said gases through the metal contained within said cupola.

3. A cupola comprising an upright body portion having a melting chamber at the lower part thereof, said body portion including a hollow wall, tuyères located in the lower portion of said cupola below the melting zone therein and communicating with said hollow wall, means for supplying air under pressure to the hollow wall of said cupola to discharge through said tuyères, a fuel supply casing depending from the top of said cupola and terminating adjacent the lower portion thereof above the melting zone, said fuel supply casing having a hollow wall communicating with outwardly-directed discharge openings at the lower portion thereof, means for forcing air through the hollow walls of said fuel casing to discharge through said outwardly-directed openings, said cupola including a space surrounding the hollow walled fuel supply casing for containing metal to be melted within said cupola, the air escaping from the outwardly-directed discharge openings of said fuel casing mixing with the gases escaping from the melting zone prior to the passage of said gases through the metal contained in the space surrounding said fuel casing, and means for discharging the gases from said cupola after the passage of said gases through the metal contained therein, the air supplied to said tuyères and to said outwardly-directed discharge openings being heated, respectively, by passage through the hollow wall of the cupola and through the hollow wall of the fuel supply casing.

4. A method of cupola operation for melting metals and the like by burning carbonaceous fuel, which consists in establishing and maintaining a melting zone within the lower portion of the cupola; feeding a mass of metal from the upper portion of the cupola to the melting zone with the bottom of said mass resting on the upper surface of the material in said zone and with said mass in direct contact with the gases escaping from said zone; feeding a mass of fuel from the upper portion of the cupola to the melting zone with the bottom of said mass resting on the upper surface of the material in said zone, said mass of fuel being out of contact with the mass of metal while in the upper portion of the cupola but contacting therewith upon reaching the melting zone, and said mass of fuel being out of contact with the gases escaping from said melting zone; and forcing air outwardly through the mass of metal from the zone of contact between said mass of metal and said mass of fuel to mix with the gases passing from the melting zone through the mass of metal before said gases pass through said mass of metal whereby a second combustion of said gases occurs with resulting preheating of the mass of metal.

5. A method of cupola operation for melting metals and the like by burning carbonaceous fuel, which consists in establishing and maintaining a melting zone within the lower portion of the cupola; feeding an annular mass of metal from the upper portion of the cupola to the melting zone with the bottom of said annular mass of metal resting on the upper surface of the material in said zone and with said annular mass of metal in direct contact with the gases escaping from said zone; feeding a column of fuel from the upper portion of the cupola to the melting zone with the bottom of said column resting on the upper surface of the material in said zone, said column of fuel being surrounded by and out of contact with the annular mass of metal while in the upper portion of the cupola but contacting with and being surrounded by said annular mass of metal upon reaching the melting zone, and said column of fuel being out of contact with the gases escaping from said melting zone; and forcing air in an outward, radial direction from the zone of contact between the mass of metal and the column of fuel, which air mixes with the gases passing from the melting zone through the mass of metal before said gases pass through said mass of metal whereby a second combustion of said gases occurs with resulting preheating of the mass of metal.

6. A method of cupola operation for melting metals and the like by burning carbonaceous fuel as defined in claim 4, wherein the air which is forced outwardly through the mass of metal from the zone of contact between said mass of metal and said mass of fuel is preheated by the heat of the cupola.

ALBERT MAAG.